United States Patent
Toba

[15] 3,701,002
[45] Oct. 24, 1972

[54] VOLTAGE-MULTIPLYING RECTIFIER APPARATUS

[72] Inventor: Takao Toba, Yokohama, Japan

[73] Assignee: Denki Onkyo Co., Ltd., Ohtaku, Tokyo, Japan

[22] Filed: March 13, 1972

[21] Appl. No.: 233,959

[30] Foreign Application Priority Data

March 13, 1971 Japan ..................... 46/16768

[52] U.S. Cl. .................................. 321/15, 321/8 R
[51] Int. Cl. ............................................. H02m 7/00
[58] Field of Search ................................... 321/8, 15

[56] References Cited

UNITED STATES PATENTS

| | | |
|---|---|---|
| 3,225,258 | 12/1965 | Brekoo et al. ............... 321/15 |
| 3,568,036 | 3/1971 | Rosenberg .................. 321/15 |
| 3,638,073 | 1/1972 | Bernstein .................. 321/8 R |
| 3,646,424 | 2/1972 | Dangschat .................. 321/15 |

Primary Examiner—William M. Shoop, Jr.
Attorney—James E. Armstrong et al.

[57] ABSTRACT

A voltage-multiplying rectifier apparatus comprised of a plurality of rectifier elements which are connected in series and a plurality of capacitors which are connected in parallel with said rectifier elements, wherein the rectifier elements are spirally arranged around a vertical axis of the apparatus.

19 Claims, 11 Drawing Figures

PATENTED OCT 24 1972

PATENTED OCT 24 1972 3,701,002

VOLTAGE-MULTIPLYING RECTIFIER APPARATUS

BACKGROUND OF THE INVENTION

The present invention relates to a voltage-multiplying rectifier apparatus comprised of a plurality of rectifier elements which are connected in series and a plurality of capacitors each of which is connected between two unconnected ends of the rectifier elements.

Since this type of a rectifier apparatus is designed to obtain a high voltage, a problem is the dielectric strength between rectifier elements, between capacitors, or between a rectifier element and a capacitor and a size of assembly because the rectifier apparatus is assembled with a plurality of rectifier elements and a plurality of capacitors.

Conventionally, most rectifier apparatuses of this type have been comprised of the rectifier elements in the zigzag type flat arrangement. Therefore, they are disadvantageous because the entire construction is excessively large and assembly is difficult.

The present invention provides a voltage-multiplying rectifier apparatus, as described above, which is capable of being compact by vertically arranging the entire construction of the assembly and excels in the dielectric strength.

SUMMARY

A voltage-multiplying rectifier apparatus comprised of an input terminal, an output terminal, at least three rectifier elements such as, for example, silicon rectifier elements which are arranged so that their ends which are series-connected between said input and output terminals and are connected each other many be positioned close each other, capacitors which are connected in parallel with adjacent rectifier elements at both sides, and rectifier element retaining means such as, for example, retaining plates which are arranged vertically and provided with retaining portions such as, for example, retaining notch at the side edges of the retaining plates, wherein two of said rectifier elements which are connected each other are supported by mounting at said retaining notches so that the two rectifier elements form a certain degree of angle, for example 90°, in the same horizontal plane, a rectifier element being connected to one of said two horizontally-arranged rectifiers is vertically positioned, at least one rectifier component comprised of said three rectifier elements is connected between the first rectifier element of one rectifier component and the third rectifier element of another rectifier component, and a plurality of rectifier elements are arranged to spirally build up in one direction around a vertical axis within the angle formed by said horizontally arranged rectifier elements.

BRIEF DESCRIPTION OF DRAWINGS

The present invention is illustrated in detail by the accompanying drawings whereon.

DETAILED DESCRIPTION

Figure 1:
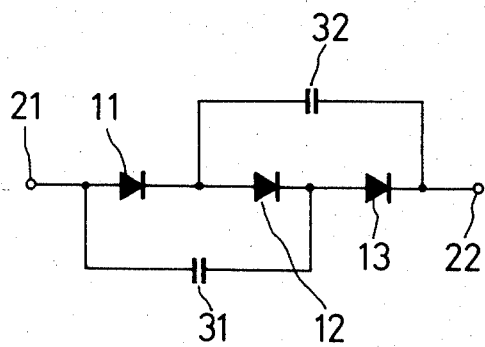
FIG. 1 is a connection diagram illustrating the circuits of the voltage-multiplying apparatus.

Referring to FIG. 1, there is shown a connection diagram of a voltage-multiplying rectifier apparatus wherein three rectifier elements are employed.

Rectifier elements 11, 12 and 13 are series-connected between input terminal 21 and output terminal 22. Capacitors 31 and 32 are parallel-connected to a pair of rectifier elements between the terminals, which are not connected each other, of a pair of adjacent rectifier elements.

Figure 2:
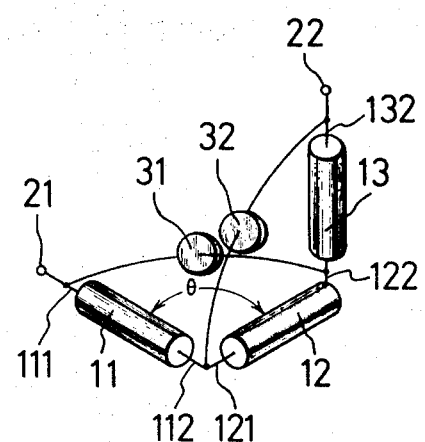
FIG. 2 is an isometric view of an embodiment according to the present invention.

Said connection method can be applied also is more than three rectifier elements are provided. FIG. 2 shows a fundamental three-dimensional construction of the apparatus according to the present invention when three rectifier elements are employed.

Rectifier elements 11 and 12 are arranged with a horizontal angle $\theta$, for example, 90° in FIG. 2, closely located terminals 112 and 121 of both rectifier elements 11 and 12 are connected and capacitor 31 is connected in parallel with these two rectifier elements between the other remotely located terminals 111 and 122 of rectifier elements 11 and 12.

With this connection, rectifier elements 11 and 12 and capacitor 31 form a right-angled triangle in a horizontal plane. Rectifier element 13 is a vertically connected to terminal 122 of rectifier element 12.

Capacitor 31 in parallel with rectifier elements 12 and 13 is connected to remotely located terminals 121 and 132 of rectifier elements 12 and 13.

With this connection, rectifier elements 12 and 13 and capacitor 32 form a right-angled triangle in a vertical plane.

Thus, the rectifier elements and capacitors are connected in the manner shown in FIG. 1.

Figure 3:
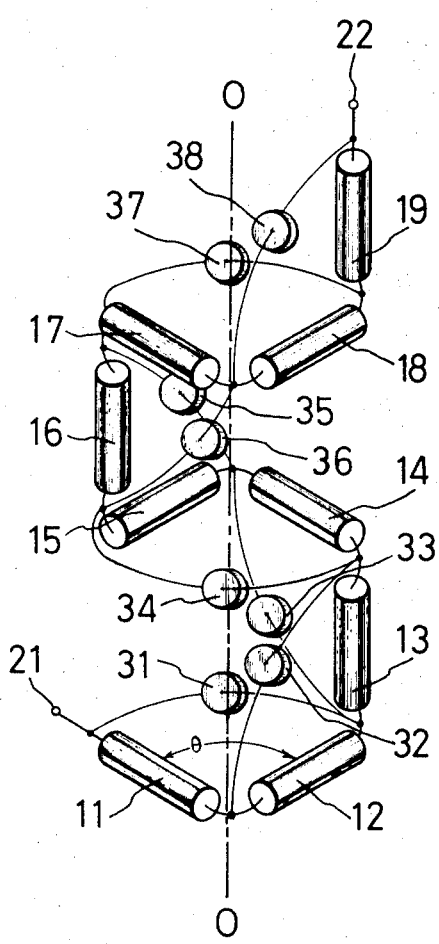
FIG. 3 is an isometric view illustrating the construction of a plurality of rectifier components arranged according to the present invention.

FIG. 3 shows nine rectifier elements according to the present invention which are series-connected so that every three of nine rectifier elements forms one rectifier component and three rectifier components thus formed are connected in series.

Rectifier elements 11 to 19 are connected in series and capacitors 31 to 38 are respectively connected in parallel with a pair of rectifier elements which are connected each other. A group of rectifier elements 11, 12 and 13, that of rectifier elements 14, 15 and 16; and that of rectifier elements 17, 18 and 19 are arranged in the form of rectifier component shown in FIG. 2.

Rectifier element 14 of the second rectifier component consisting of rectifier elements 14, 15 and 16 which is horizontally positioned and connected to the first rectifier component consisting of rectifier elements 11, 12 and 13 is arranged so that it is positioned in parallel with rectifier element 11 of the first rectifier component and at the same side as rectifier element 11 in reference to a vertical plane formed by rectifier elements 12 and 13. Furthermore, rectifier element 17 of the third rectifier component consisting of rectifier elements 17, 18 and 19 which is horizontally positioned and connected to said second rectifier component is arranged so that it is positioned in parallel with rectifier element 14 and at the same side as rectifier element 14 in reference to a vertical plane formed by rectifier elements 15 and 16.

Thus, all the rectifier elements are arranged in a spiral direction around axis 0 shown with a one-dot-broken line in FIG. 3 along the vertical planes of a right square cylinder.

In the above arrangement, the rectifier components which are respectively comprised of three rectifier elements are connected in series. However, the rectifier component at the output terminal need not always have three rectifier elements; for example, the rectifier elements 18 and 19 can be omitted or only rectifier element 19 can be omitted.

The rectifier elements and capacitors thus arranged and connected are retained by retaining means. The retaining means is vertically arranged and is comprised of the retaining plates provided with notched retaining portions at the side edges. The horizontally positioned rectifier elements can be retained at said notched retaining portions.

Figure 4:
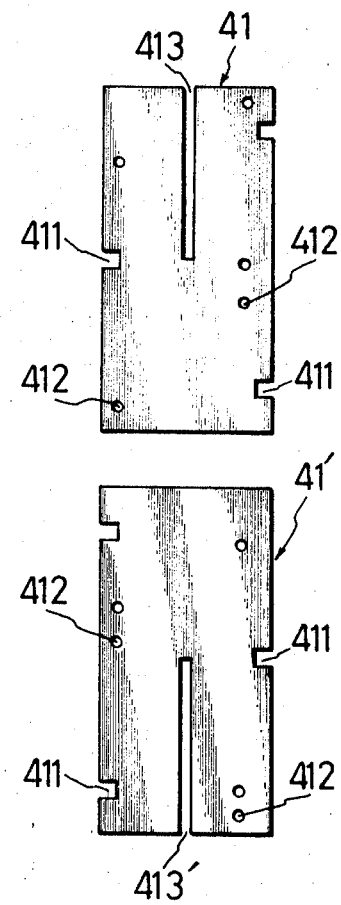
FIG. 4 is a front view of an example of a rectifier element retaining means to be employed in an embodiment of the present invention.

FIG. 4 shows a pair of retaining plate elements 41 and 41'. Retaining plate 4 is formed by assembling retaining plate elements 41 and 41'.

Both side edges of said retaining plate elements are notched with fixed intervals but a plurality of notches 411 at one side of a retaining plate element are provided in the level different from those notches at the other side of the retaining plate element. These notches serve as said retaining portions. Moreover, a plural number of through holes 412 are provided at the retaining plate elements. These through holes are used for passing the lead wires of the capacitors.

Said retaining plate elements are provided with slots 413 and 413' which are formed by cutting the elements from the lower end to the center and from the upper end to the center, as shown, respectively along the lengthwise center line in order to assemble the retaining plate elements. Said slots serve, as shown in FIG. 5, to assemble both retaining plate elements in the cross direction to form the retaining plate.

Figure 5:
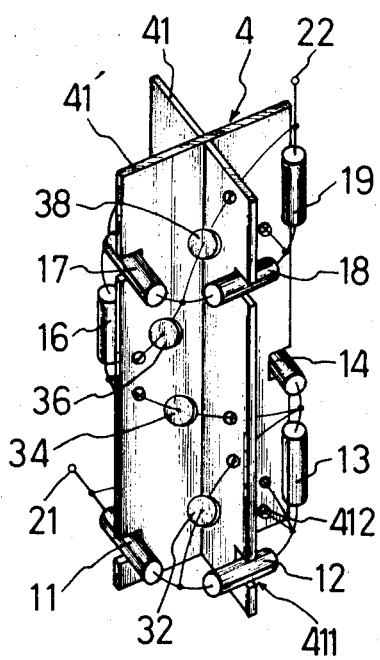
FIG. 5 is an isometric fiew illustrating an embodiment employing said rectifier element retaining means according to the present invention.

Retaining plate 4 thus formed in the cross direction retains as shown in FIG. 5 the rectifier assembly which is arranged as shown in FIG. 3. Horizontally positioned rectifier elements are respectively mounted at notched retaining portions 411 and vertically positioned rectifier elements are retained by the lead wires between horizontally positioned rectifier elements and vertically positioned rectifier elements. The lead wire of each capacitor is passed through hole 412 so that the capacitor is partitioned with at least one retaining plate from the intermediate connected portion of a pair of rectifier elements connected in parallel with the capacitor.

Figure 6:
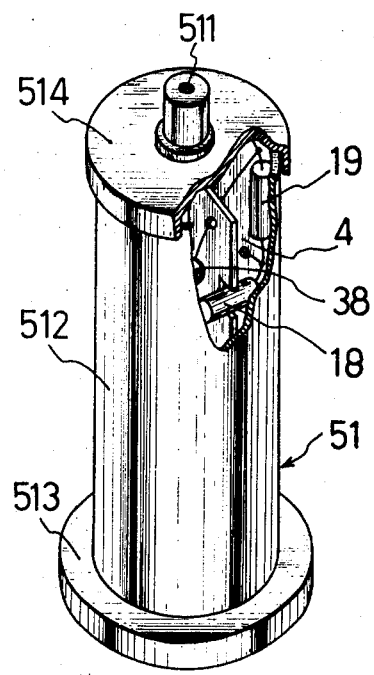
FIGS. 6 and 7 are cutaway views illustrating an embodiment of the present invention.

The retaining plate at which the rectifier elements and capacitors are mounted is covered with casing 51 as shown in FIG. 6. This casing is comprised of, for example, cylindrical casing body 512 the lower end of which is fixed to base plate 513, cover plate 514 provided with through hole 511 at the top center so that it is remountable and base plate 513 to close the lower end of cylindrical body 512, as shown in the figure.

Casing 51 thus formed incorporates said retaining plate and is filled with an electrically insulating filler. This filler is desirable to have a hardening property; for example, the silicon compound can be used. In this case, the lead wire is passed through hole 511.

Through hole 511 can be also provided at casing body 512.

Figure 7:
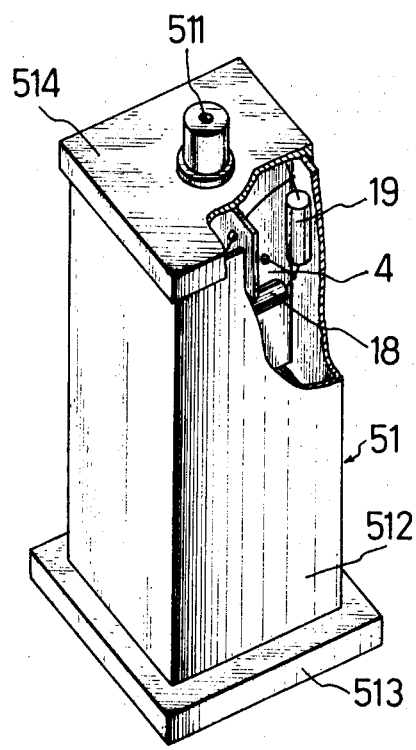

As described above, casing body 512 can be cylindrical. However, it is desirable to form the casing body in the form of a square cylinder as shown in FIG. 7 since the rectifier elements are horizontally retained on the side edges of the retaining plate and the assembly of the retaining plate and the rectifier elements forms approximately a right square as seen from the above.

In the above embodiment, said retaining plate can be used when three rectifier elements are employed. In this case, both retaining plate elements can be respectively provided with one notched retaining portion because two rectifier elements which are horizontally positioned are employed.

In this arrangement, angle $\theta$ formed by two rectifier elements positioned in the same plane is 90°. As described above, however, this angle can be optionally determined; for example, angle $\theta$ can be 60°.

Figure 8:
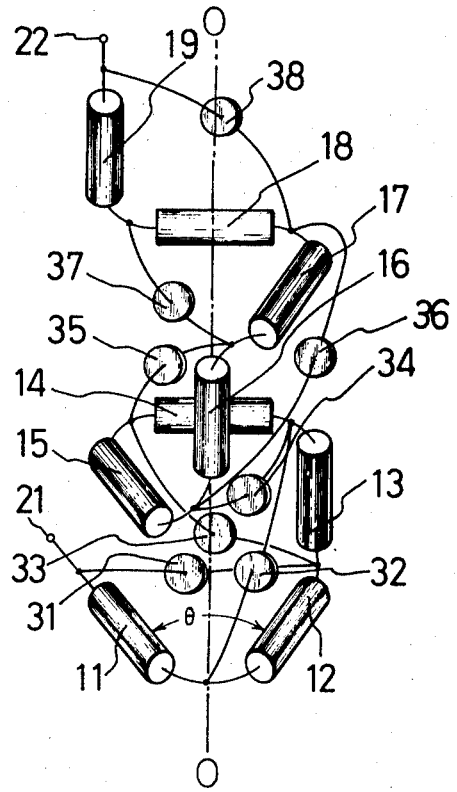
FIG. 8 shows another embodiment of the present invention illustrated in FIG. 3.

In this case, two rectifier elements 11 and 12 of a rectifier component at the input terminal side are arranged to form, as shown in FIG. 8, two sides of a triangle at the bottom of a supposed trigonal prism and horizontally positioned rectifier element 14 of the other rectifier element connected to this rectifier element is arranged to form one side of a triangle at the top of said trigonal prism which is positioned corresponding to said two sides. Thus, the rectifier elements can be connected in sequence to form the voltage-multiplying rectifier apparatus according to the present invention.

Figure 9:
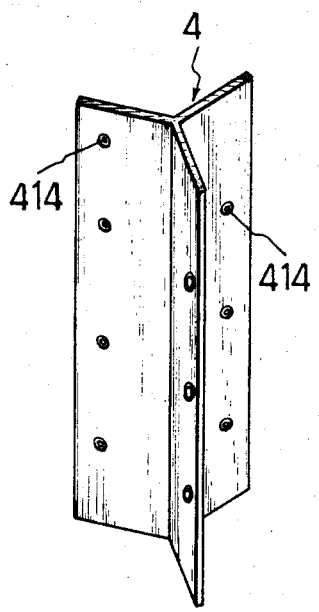
FIG. 9 is an isometric view illustrating another embodiment of the present invention.

In this case, the retaining plate can be Y-shaped retaining plate 4 consisting of three retaining plate elements which are arranged with 120° interval so that their one end is positioned vertically along the center line of said trigonal prism as shown in FIG. 9.

Figure 10:
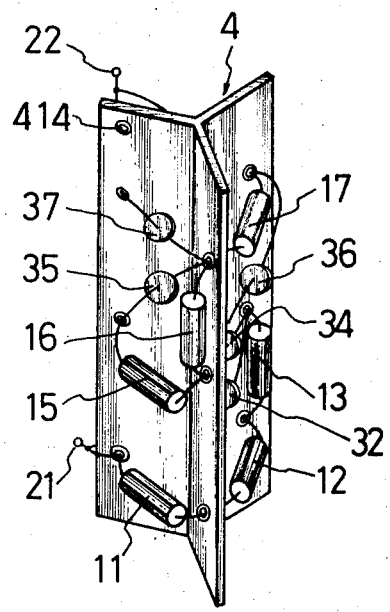
FIGS. 10 and 11 are isometric views illustrating an embodiment of the construction according to the present invention.

If this retaining plate is employed, the horizontal rectifier elements can be arranged in the spaces formed by either two of three retaining plate elements of the retaining plate as shown in FIG. 10 and the lead wires of the rectifier elements can be connected to terminals 414 provided at the side edges of the retaining plate elements. The vertical rectifier elements can be arranged along the edges of the retaining plate elements and the lead wires of the retaining plate elements can be connected to the terminals provided at the side edges of the retaining plate elements as shown.

In this arrangement, it is also desirable to arrange, as described above, the rectifier elements in the spiral one-way direction in reference to axis 0 of the retaining plate as in the case that horizontal rectifier elements are positioned at a right angle.

Figure 11:
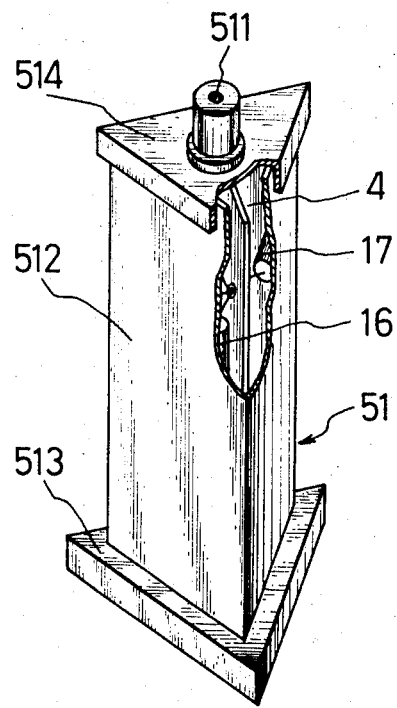

In this embodiment, the casing can be cylindrical as in the embodiment shown in FIG. 6. Furthermore, the casing can house the retaining plate which is assembled in the form of a trigonal prism as shown in FIG. 11.

The voltage-multiplying rectifier apparatus according to the present invention is as described above; therefore it is advantageous in the following points.

The construction of the entire voltage-multiplying rectifier apparatus can be made comparatively small because all rectifier elements are arranged three-dimensionally. Discharge hardly occurs because electrical insulation effect between the rectifier elements is high and the potential difference between the rectifier elements which are arranged in parallel is uniform.

When the retaining plate as an embodiment of the present invention is employed, the dielectric strength is large because the rectifier elements are partitioned by the retaining plate elements.

Assembly of the entire voltage-multiplying rectifier apparatus is easily performed.

What is claimed is:

1. A voltage-multiplying rectifier apparatus comprised of
   a. an input terminal,
   b. an output terminal,
   c. at least three rectifier elements being series-connected between said input and output terminals,
   d. a plural number of capacitors of which each one end is parallel-connected between each two of the rectifier elements, and
   e. a retaining means which retains said rectifier elements, wherein the first and second rectifier elements, which are connected each other, of said rectifier elements are horizontally arranged in the same plane to form a certain angle, the third rectifier element being connected to the second rectifier element is vertically arranged, and each rectifier component comprised of these three rectifier elements is connected in series between the first rectifier element of a certain adjacent rectifier component and the third rectifier element of another adjacent rectifier component.

2. A voltage-multiplying rectifier apparatus according to claim 1, wherein the first rectifier elements and the second rectifier elements of adjacent rectifier components are positioned in parallel so that the first rectifier element of one of mutually adjacent rectifier components is opposed the second rectifier element of the other rectifier component and the second of the former component is opposed to the first rectifier element of the latter component.

3. A voltage-multiplying rectifier apparatus according to claim 1, wherein the first rectifier element of one of adjacent two rectifier components and the second rectifier element of the other of the rectifier components are positioned in the perpendicular plane.

4. A voltage-multiplying rectifier apparatus according to claim 1, wherein one rectifier element is series-connected between the first rectifier element of the rectifier component closest to the output terminal and the output terminal and a capacitor is connected to said two rectifier elements.

5. A voltage-multiplying rectifier apparatus according to claim 1, wherein two rectifier elements positioned in the same plane are series-connected between the third rectifier element of the rectifier component closest to the output terminal and the output terminal and a capacitor is parallel-connected to two rectifier elements, which are connected each other, of said three rectifier elements.

6. A voltage-multiplying rectifier apparatus according to claim 1, wherein said rectifier element retaining means is formed with vertically positioned retaining plates.

7. A voltage-multiplying rectifier apparatus according to claim 6, wherein a plurality of notched retaining portions are provided at the side edges of said retaining plate so that the rectifier elements may be retained at said notched retaining portions.

8. A voltage-multiplying rectifier apparatus according to claim 6, wherein said retaining plate is formed with four plates which are crossed as seen from the above.

9. A voltage-multiplying rectifier apparatus according to claim 6, wherein a plurality of terminals are provided at the side edges of said retaining plate.

10. A voltage-multiplying rectifier apparatus according to claim 9, wherein said retaining plate is formed with three plates which are contacted at the axis.

11. A voltage-multiplying rectifier apparatus according to claim 1, wherein said rectifier element retaining means is housed in a casing.

12. A voltage-multiplying rectifier apparatus according to claim 11, wherein said casing is comprised of a tubular body in which said retaining means is housed, a base being fixed at one end of the tubular body and a cover being fixed to cover the other end of the tubular body.

13. A voltage-multiplying rectifier apparatus according to claim 12, wherein said casing body is made in the form of cylinder.

14. A voltage-multiplying rectifier apparatus according to claim 12, wherein said casing body is made in the form of a square tubular body.

15. A voltage-multiplying rectifier apparatus according to claim 12, wherein said casing is made in the form of a triangular tubular body.

16. A voltage-multiplying rectifier apparatus according to claim 12, wherein at least one through hole is provided at said cover plate.

17. A voltage-multiplying rectifier apparatus according to claim 12, wherein at least one through hole is provided at said casing body.

18. A voltage-multiplying rectifier apparatus according to claim 11, wherein said casing is filled with an electrically insulating filler.

19. A voltage-multiplying rectifier apparatus according to claim 18, wherein a hardening filler is employed as the filling material.

* * * * *